United States Patent [19]

Sammarco

[11] 4,403,670
[45] Sep. 13, 1983

[54] ADJUSTABLE DRAWBAR

[75] Inventor: Peter Sammarco, Downers Grove, Ill.

[73] Assignee: International Harvester Co., Chicago, Ill.

[21] Appl. No.: 272,146

[22] Filed: Jun. 10, 1981

[51] Int. Cl.³ .............................................. B60D 1/02
[52] U.S. Cl. .................................. 180/14 R; 280/482; 280/515
[58] Field of Search .................. 180/14 R, 14 B, 14 E; 280/482, 506, 515; 172/76, 78

[56] References Cited

U.S. PATENT DOCUMENTS

| | | | |
|---|---|---|---|
| 3,557,892 | 1/1971 | Burrough | 180/14 R |
| 3,908,398 | 9/1975 | Braunberger | 180/14 B |
| 4,008,905 | 2/1977 | Soteropulos | 280/506 |
| 4,156,473 | 5/1979 | Myers | 180/14 R |
| 4,195,704 | 4/1980 | Bass | 180/14 R |

FOREIGN PATENT DOCUMENTS 1176642  4/1959  France ............................. 280/482

Primary Examiner—John A. Pekar
Attorney, Agent, or Firm—Boris Parad; F. David Aubuchon

[57] ABSTRACT

An adjustable drawbar, which is capable of longitudinal adjustment to accommodate implements having power lines of different lengths, having a hitch pin hole at one end to permit attachment of an implement and a plurality of bores through its other end. A bracket having aligned apertures is affixed to the tractor and supports the other end of the drawbar. A pin carried by a bell crank assembly mounted on the tractor is movable by means of a control rod between an adjust position in which the pin is extracted from at least one of said apertures and a hold position in which the pin extends through both apertures and an aligned one of the plurality of bores.

7 Claims, 3 Drawing Figures

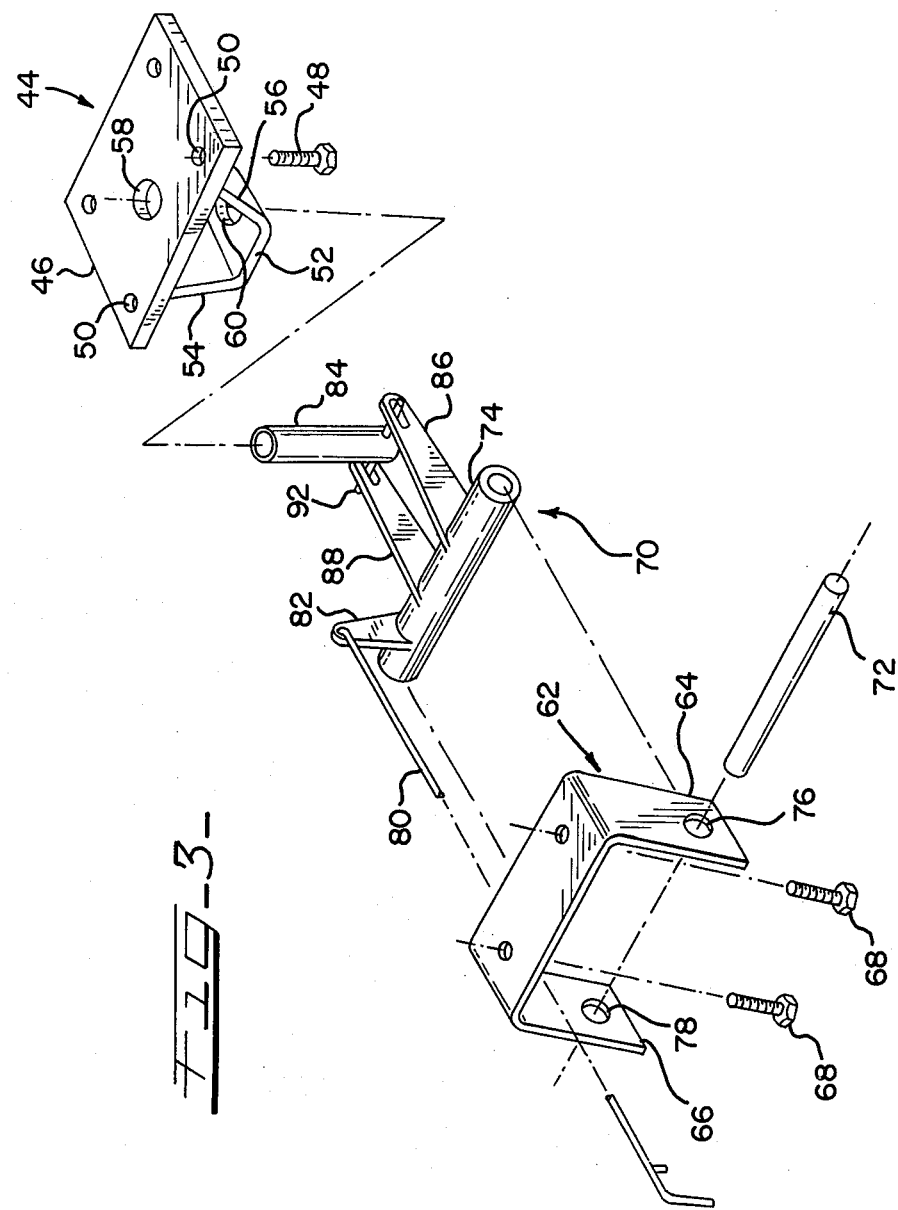

ADJUSTABLE DRAWBAR

BACKGROUND AND SUMMARY OF THE INVENTION

In a conventional tractor with a swinging drawbar system, it is common practice for most tractor-implement combinations to provide a standard length of drawbar, i.e. the distance in a longitudinal or fore-and-aft direction that the drawbar extends beyond the rear of the tractor. In some cases the drawbar is not used at all and it must be fully retracted to a stored position. In other cases the implement has a power drive and thus must be connected to the power take-off (PTO) shaft of the tractor. In such cases the drawbar is restrained to preclude its swinging from side to side, or laterally, and in effect is rendered fixed. Power lines are utilized to effect the connection of the power train of the implement to the PTO of the tractor. The power line includes a pair of cardan universal joints, commonly called U-joints, to allow the implement, which is pinned to the free end of the drawbar, to pivot relative to the tractor and still transmit power from the tractor PTO to the implement. The common type of U-joint, while permitting drive through an angle, has non-uniform velocity characteristics which can be compensated for, or cancelled by use of a second U-joint, but only if the angles through which the two U-joints are transmitting power are equal. Of course, when the tractor and implement are oriented in a straight line there are no angular relationships created in the drive line. The equal angles are necessary then only during turns, or when traversing uneven ground wherein the tractor and implement shafts are not aligned with each other. In order for the drive line angles to be equal during turns, the point of attachment of the implement to the drawbar, i.e. the center line of the drawbar hitch hole, must be directly under the mid-point of the U-joint assembly when the tractor-implement combination is in a straight line relationship. Because the U-joint assemblies for different power train implements have lengths which vary, it is important that the drawbar length be adjusted so that the hitch pin hole in the free end of the drawbar will be positioned just below the mid-point of each U-joint assembly. If this relationship is not maintained, vibration and accelerated wear in the cross member of the U-joint assemblies and telescoping parts of the drive line will occur when the tractor and implement are angled relative to each other.

In the prior art, the drawbar was secured at one end to the underbody framework of the tractor, usually by means of a pin which engaged a hole formed in a heavy casting of the tractor frame, such as the transmission housing. This pin not only anchored the drawbar but also functioned as the pivot point for the swinging drawbar. The drawbar usually had two additional holes, one close to the fixed end of the drawbar and one spaced a distance therefrom toward the free end of the drawbar; the latter of which would retain the drawbar in its stored position when the pin was inserted therethrough to engage the pivot hole. Adjustment between these two positions required an operator to crawl under the tractor, manually remove the pin, physically reposition the drawbar to the desired position longitudinally, and reinsert the pin into the pivot hole. Such a procedure is cumbersome, inconvenient and time-consuming. Adjustment in the prior art to accommodate different lengths of drive lines on power driven implements almost universally involved the addition of some device to the hitch hole end of the drawbar, as exemplified by U.S. Pat. Nos. 3,557,892, 4,008,905, 4,156,473, and 4,195,704. Such devices are also cumbersome to handle, necessitate storage when not in use and are time consuming to install and remove.

It is, therefore, an object of this invention to provide an adjustable drawbar which is self storing and which permits easy and quick adjustment of its length.

It is also an object of this invention to provide an equal angular adjustable drawbar which permits a full range of adjustments between stored and fully extended to accommodate the longer commercially available drive line without additional parts or material, and which may be adjusted throughout such range without the need for crawling under the tractor.

It is another object of this invention to provide an adjustable drawbar which can be adjusted over a wide range, which is relatively simple and inexpensive to manufacture and install, which is easy and quick to adjust, and which provides visual indication of whether the drawbar is properly adjusted.

These and other objects of the present invention, and many of the attendant advantages thereof, will become more readily apparent upon a perusal of the following description and the accompanying drawings, wherein:

FIG. 3 is an expanded view of a portion of the adjustable drawbar shown in FIG. 2.

DESCRIPTION OF A PREFERRED EMBODIMENT

Figure 1:
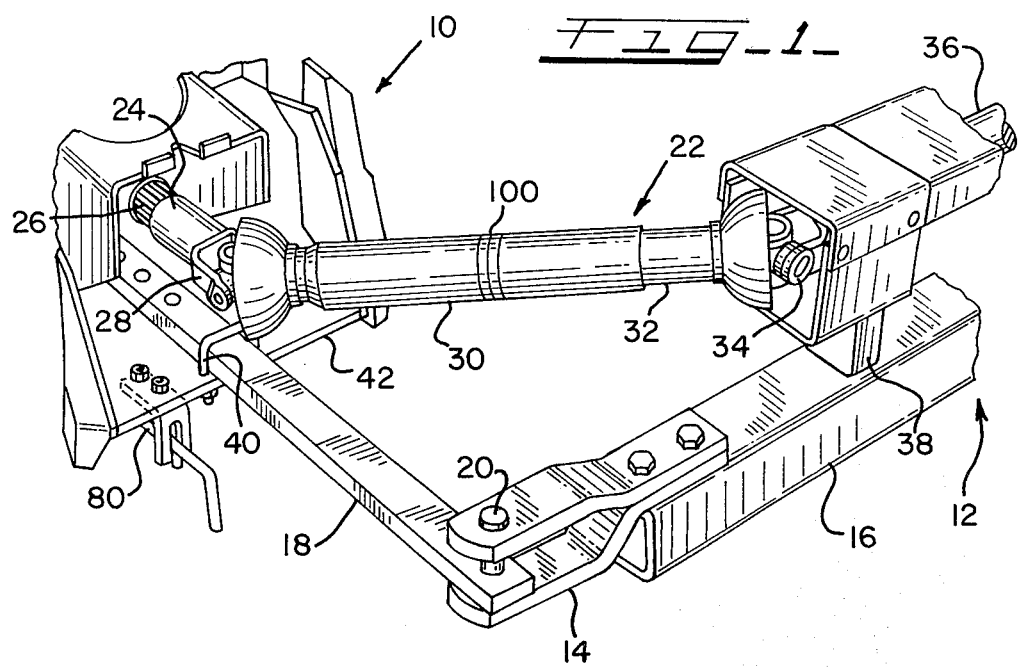
FIG. 1 is a pictorial view of portions of a tractor-implement combination incorporating an adjustable drawbar according to the present invention.

Referring now to FIG. 1, a tractor, a portion of which is shown at 10, is coupled to a power driven implement, a portion of which is shown at 12. The implement has a clevis 14 affixed to the end of a tongue 16, and is pivotally attached to the drawbar 18 of the tractor by a hitch pin 20 inserted through aligned holes in the clevis 14 and a hitch pin hole in the drawbar 18. The towing force is transmitted from the tractor 10 through the drawbar 18, the clevis 14 and the tongue 16 to the implement 12. Rotary power is transmitted to the implement by the implement drive line, indicated generally at 22, which includes an input hub 24 having internal splines to engage the externally splined tractor PTO shaft 26. A U-joint has one of its yokes 28 affixed to the outer end of input hub 24 and the other of its yokes attached to the outer tubular shaft 30. The shaft 30 is provided with internal splines which are complementary to and engage with the external splines of shaft 32 which arrangement permits the mating power shafts 30 and 32 to collapse and extend as the tractor 10 is steered causing the angular relationship between the tractor and implement to change and hence the distance therebetween to change. A second U-joint yoke 34 connects between the shaft 32 and output shaft 36, which is journalled by support 38 on the top of the tongue 16. The journal support 38 precludes movement of the shaft 36 relative to the tongue 16 except for its rotational movement. The drawbar 18 when used, as shown in FIG. 1, with a PTO driven implement must be restrained from swinging. This may be achieved, for example, by means of a U-bolt 40 which spans the drawbar and extends through a pair of holes in a plate 42 affixed to the tractor 10.

As illustrated in FIG. 1, the numerals 30 and 32 denote a telescoping shield arrangement with the actual shafts having the physical properties ascribed to the shield arrangement being covered thereby. Both the actual shafts and the telescoping shields are old and well known in the art and depiction of the actual shafts is not necessary for a complete understanding of the invention; the shield members being theoretically the functional equivalents of the drive shafts when provided with the attributes denoted above.

Figure 2:
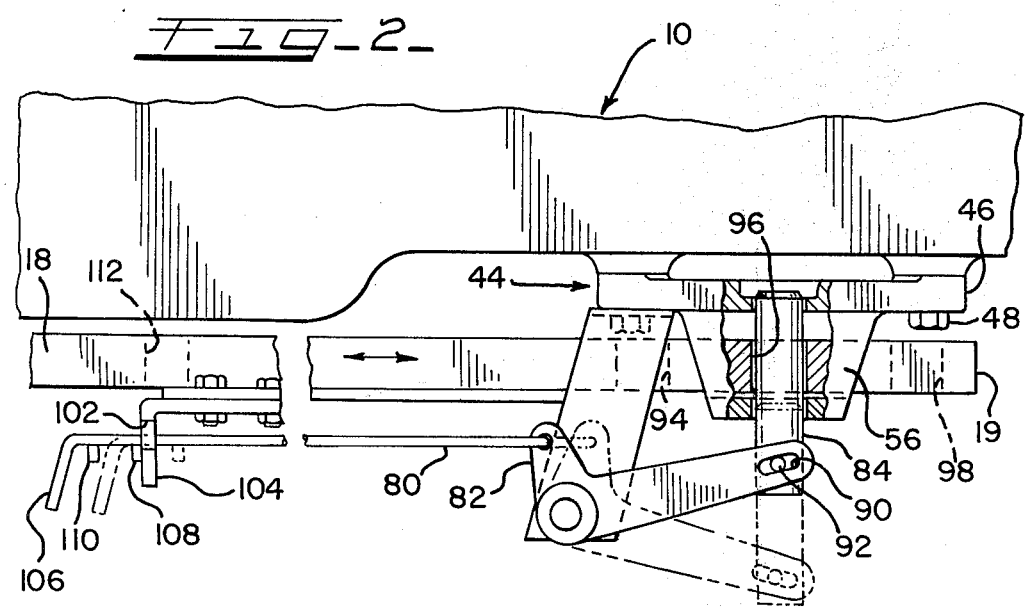
FIG. 2 is a side elevational view of the adjustable drawbar shown in FIG. 1.

Referring now to FIGS. 2 and 3, a bracket, indicated generally at 44, which preferably takes the form of a casting, includes a base plate 46 which is secured to the underside of the tractor, such as by bolts 48 inserted through holes 50 in the base plate 46 and engaging tapped holes formed in the transmission housing of the tractor, for example. The bracket 44 also includes a lower plate 52 which is bifurcated into legs 54 and 56, the legs being secured to or formed in situ with the base plate 46, thereby forming an opening through which the drawbar 18 may be inserted. A pair of aligned holes 58 and 60 are provided in the plates 46 and 52 respectively.

A U-shaped bracket 62 having downward depending legs 64 and 66 is affixed to either the base plate 46, as shown in FIG. 2, or directly to the transmission housing, by bolts 68. A bellcrank 70 is pivotally supported on a rod 72 which extends through a tubular portion 74 of the bellcrank 70 and holes 76 and 78 formed in the legs 64 and 66 respectively. A control rod 80 is pivotally attached to one arm 82 of the bellcrank 70. A pin 84 is connected to the other arm of the bellcrank 70, which pin has a slightly smaller diameter than the diameter of the holes 58 and 60 to permit ready withdrawal and insertion of the pin 84 as the bellcrank 70 is rotated on the rod 72. In order to minimize the possibility of binding, the arm supporting the pin 84 is preferably a pair of arms 86 and 88, one arm positioned on each side of the pin 84. A slot 90 in the end of each arm 86 and 88 support a cross pin 92 which also extends through the pin 84. The slots 90 permit a straight line motion for the pin 84, even though the end of the arms 86 and 88 trace a circular arc as the bellcrank 70 is rotated on rod 72. Rotation of the bellcrank 70 counterclockwise to the solid line position shown in FIG. 2 will cause the pin 84 to be elevated so that it engages the hole 58 in the base plate 46 in addition to the hole 60 in the plate 52. Rotation of the bellcrank 70 clockwise to the dotted line position in FIG. 2 will lower the pin 84 so that the top of this pin will be just level with or slightly below the upper surface of plate 52. With this relationship the drawbar 18 may be slid in and out relative to the plate 52 without any interference from pin 84.

The pivot hole end of the drawbar 18 has a plurality of holes 94, 96 and 98, which holes have a diameter substantially equal to that of the holes 58 and 60 and are therefore capable of readily receiving the pin 84. With the pin 84 lowered, fore-and-aft alignment of one of the holes 94, 96 and 98 is achieved by pushing or pulling forces applied manually to the protruding end of the drawbar 18. Lateral alignment is aided by making the width of the lower plate 52 substantially equal to the width of the drawbar and by angling the arms 54 and 56 downward and inward toward the plate 52. The angled arms 54 and 56 will urge the drawbar 18 toward a position in which the holes in the drawbar will be laterally aligned with the holes in the plates 46 and 52, thereby leaving only the fore-and-aft positioning of the drawbar to the judgement of the operator.

For each implement and its drive line, there is a predetermined mid-point distance which is published by the implement manufacturer; that information often included in a prominent notice affixed to the implement per se. This distance is the distance from the end of the tractor PTO shaft to the hitch pin hole. Before attempting to connect the implement and tractor, the operator would measure from the end of the proper tractor PTO to determine the proper location of the hitch pin hole. Since the holes 94, 96 and 98 are positioned in the drawbar so that they provide appropriate distances for the drawbar to extend beyond the end of the tractor PTO shaft, the operator will be able to determine the proper one of the holes 94, 96 and 98 to be engaged by the pin 84 simply by moving the drawbar fore or aft until the hitch pin hole is that distance from the tractor PTO shaft specified by the implement. To physically make this adjustment, initially the handle 106 is lifted so that stop member 108 may pass through slot 102 and the control rod pushed forward to rotate the bellcrank 70 clockwise until the second stop member 110 engages the bracket 104. This will extract the pin 84 from the drawbar so that the drawbar is free to move fore and aft. The operator will hold a rule or measuring device to the end of the tractor PTO shaft and have the drawbar in or out until the hitch pin hole in the drawbar is the proper distance from the last mentioned shaft. The handle 106 is lifted and pulled rearward (to the left as viewed in FIG. 2) so that the stop member 108 passes through the slot 102. The handle 106 is then lowered so that stop member 104 engages the bracket 104. The pin 84 will thereby be mounted through the drawbar 18 and will be retained there. With the drawbar properly adjusted, the operator backs the tractor to the implement and inserts the hitch pin 20 through the clevis 14 and the hitch pin hole in the drawbar. The implement drive line is then connected to the tractor PTO shaft. Indicia, such as shown at 100, placed on the implement drive line, or on shield devices positioned over the drive line, at the mid-point of the drive line i.e. at the mid-point between the U-joint assemblies, provide a convenient final check of whether the drawbar is properly adjusted; i.e. with tractor and implement aligned this indicia 100 will be vertically above the hitch pin 20. Since the hitch pin 20 is to be located at the mid-point of the drive line, a change of implements, wherein the drive line of one implement is a different length than the drive line of the other implement, would properly require a movement or relocation of the hitch pin hole a distance equal to one half the difference in the length of the two drive lines.

The control rod 80 extends through a slot 102 in a bracket 104 affixed to the tractor. A handle 106 is formed on the free end of the control rod 80 to facilitate manual positioning of the bellcrank 70 and hence the vertical elevation of the pin 84. A stop 108 is affixed to the lower side of the rod 80 and has a limb such that the combined vertical thickness of the rod 80 and the stop 108 is slightly less than the length of the slot 102. Lifting of the handle 106 thereby permits the stop 104 to pass through the slot 102 and the bellcrank 70 to thereby be rotated clockwise when the control rod is pushed forward or inward and to be rotated counterclockwise when the control rod is pulled rearward or outward. Engagement of the stop 108 with the outer surface of the bracket 104 will prevent the weight of pin 84, cross pin 92 and arms 86 and 88 from rotating the bellcrank 70 clockwise, thereby assuring that the pin 84 will remain elevated to hold the drawbar in a desired position. A second stop 110 which preferably is larger than the slot 102, is affixed to the lower side of the control rod 80 and positioned so that it engages the bracket 104 when the top of pin 84 is just level with or slightly below the top of plate 52. Engagement of stop 110 with the bracket 104 to determine this relationship of pin 84 to plate 52 assures that the pin 84 will not interfere with fore-and-aft movement of the drawbar 18 and also assures that the pin 84 will not be completely extracted from the plate 52.

In order to conveniently store the drawbar 18 when it is not in use, a hole 112 is provided in the drawbar 18. This hole 112 is in all respects identical to the holes 94, 96 and 98, but is located on the drawbar in a position that permits the free end of the drawbar to extend to approximately the position of U-bolt 40. The drawbar is maintained in the stored position by the pin 84, and is removed therefrom in the same manner, through manipulation of the handle 106 on control rod 80, as described previously.

While one embodiment of the invention has been illustrated and described herein, various changes and modifications may be made therein without departing from the spirit of the invention as defined by the scope of the appended claims.

What is claimed is:

1. In a tractor having a drawbar for towing two separate implements and a PTO shaft for powering said implements, said drawbar having a hitch hole end for pivotal connection to said implements and a pivot end for attachment to the tractor, said implements having power shafts capable of coupling with said PTO shaft, said shafts having lengths which differ by a given amount, the improvement comprising:
   a bracket affixed to said tractor and having an aperture therein;
   said pivot end having a pair of holes spaced apart a distance equal to one-half said given amount and capable of being aligned with said aperture;
   a pin capable of insertion through said aperture and an aligned one of said holes; and
   means mounting said pin on said tractor to permit selective removal and insertion of said pin.

2. The invention according to claim 1 wherein said bracket comprises:
   a base plate affixed to the tractor;
   a lower plate having arms connected with said base plate and defining an opening for acceptance of said drawbar; and
   aligned apertures formed in said plates capable of receiving said pin.

3. The invention according to claim 2 wherein said lower plate has a width substantially equal to the width of said drawbar; and
   said arms diverge outwardly and upwardly away from said lower plate to urge said holes in said drawbar with lateral alignment with said apertures.

4. The invention according to claims 1 or 3 and further comprising:
   a bell crank pivotally mounted on said tractor and connected to said pin to raise and lower same upon rotation of said bell crank;
   a control rod pivotally connected to said bell crank; and
   said control rod extending outward of said tractor for remote rotation of said bell crank.

5. The invention according to claim 4 and further comprising first stop means on said control rod for maintaining said bell crank in a position to hold said pin elevated.

6. The invention according to claim 5 and further comprising second stop means for maintaining said bell crank in a position in which the top of said pin is held out of contact with said drawbar but remains in said lower plate.

7. The invention according to claim 6 wherein said power shafts have indicia thereon indicating their respective mid-points.

* * * * *